Dec. 14, 1937. F. P. MILLER 2,102,478
CUTTING TOOL
Filed May 17, 1934 2 Sheets-Sheet 1
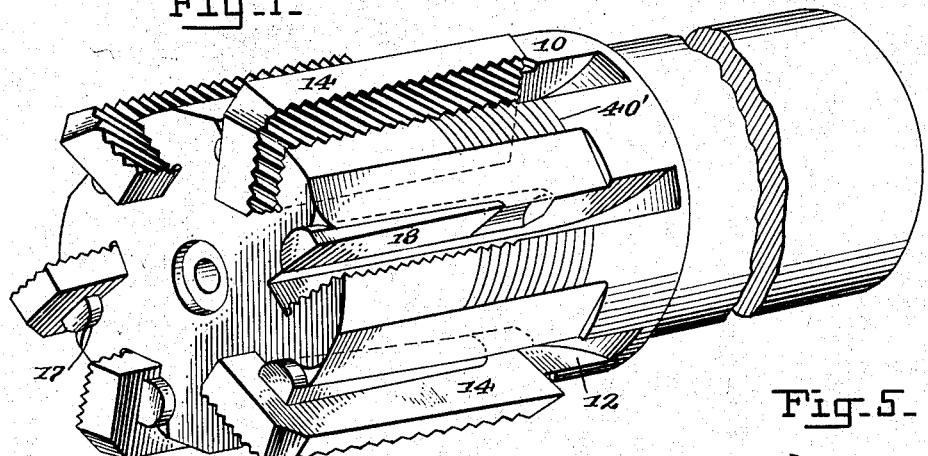
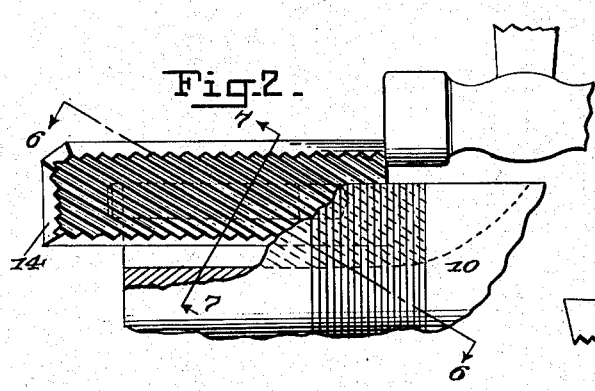
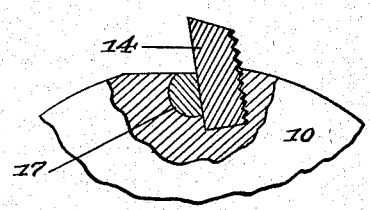
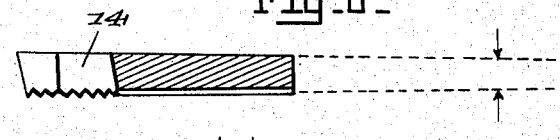
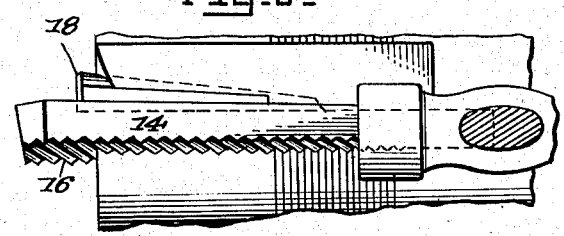
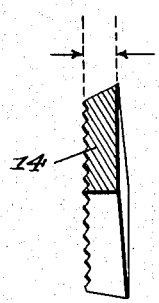
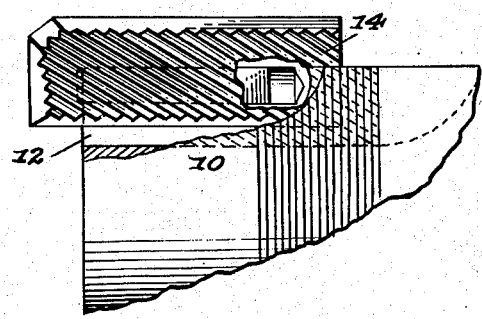
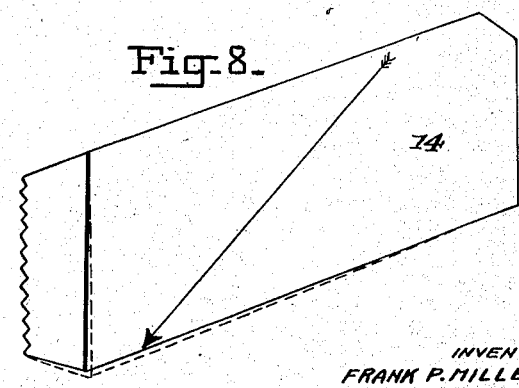
WALL THICKNESS DIMINISHED ON
LINE PARALLEL TO ADJUSTING ANGLE
INVENTOR
FRANK P. MILLER
BY
Quezada
Attorney Dec. 14, 1937.　　　　F. P. MILLER　　　2,102,478
CUTTING TOOL
Filed May 17, 1934　　　2 Sheets-Sheet 2

INVENTOR
FRANK P. MILLER
BY
Attorney

Patented Dec. 14, 1937

2,102,478

UNITED STATES PATENT OFFICE 2,102,478

CUTTING TOOL

Frank P. Miller, Meadville, Pa.

Application May 17, 1934, Serial No. 726,145

6 Claims. (Cl. 29—105)

This invention relates to milling cutters, reamers, boring heads and other forms of cutting tools of the type in which the blades are adjustably mounted.

It is, of course, recognized to be old in this art to provide a blade mounting in which the blade adusting line or angle is so disposed with relation to the longitudinal axis of the tool that the advancement of the blade along and parallel to this line brings about properly proportioned longitudinal and radial adjustment of the blade to compensate for wear and grinding.

One of the principal advances marked by this invention will be found to reside in the means by which the blade is held in properly adjusted position against the strain of the cutting thrust and other contrary influences known to accompany the use of the tool.

By way of further brief preliminary reference to the adjusting and locking means for the blade, it is pointed out that the blade is diminished inwardly in wall thickness in a direction substantially parallel to the aforesaid blade adjusting line so that the blade locking or restraining means in engagement with the side walls of the blade will securely hold the blade against yielding to the thrust thereon.

Another and related aspect of the invention has to do with the means by which the blade may be conveniently released from binding engagement with the restraining means therefor by simply driving on the rear end of the blade as distinguished from driving on the binding wedge therefor, it being noted in this connection that in those cutting tools where it is necessary to drive on the wedge to release the blade, it is required that there be provided openings, or other means in the tool for gaining access to the small end of the wedge.

Also, a cutter embodying the invention looks to simple means by which the blades may, with comparative ease, be secured in the desired position of adjustment and although the blades are individually adjusted, there will be found an ever present scale by which the blades may be adjusted co-extensively and with facility.

Other objects and advantages will be apparent during the course of the following description.

In the accompanying drawings, forming a part of this application, and in which like numerals are employed to designate like parts throughout the same, Figure 1 is a fragmentary perspective of a reamer embodying the invention, Figure 2 is a detail longitudinal sectional view through the tool and illustrating the manner in which the cutting blade may be driven forwardly and thus released, Figure 3 is a fragmentary plan view of the tool, the view illustrating the manner in which the tool may be driven forwardly and thus released from the restraining means therefor, Figure 4 is a detail longitudinal sectional view illustrating the blade in position after having been several times adjusted and reground, Figure 5 is a detail transverse sectional view through the cutter and illustrating the blade mounting, Figure 6 is a detail sectional view through one of the blades detached, the view being taken on line 6—6 of Figure 2, Figure 7 is a transverse sectional view through one of the blades detached, the view being taken on line 7—7 of Figure 2, Figure 8 is a perspective of one of the blades detached.

Figure 9:
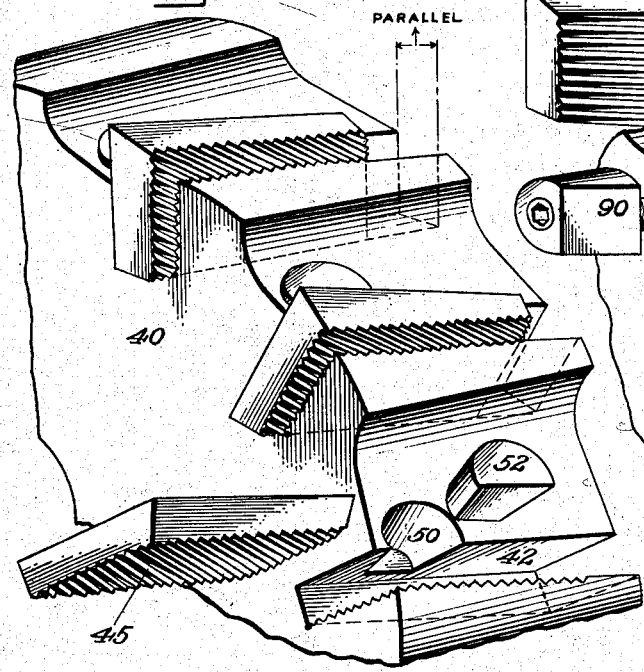
Figure 9 is a fragmentary perspective disclosing a modified form of invention.

In the drawings, the numeral 10 designates a support or body having a plurality of spaced slots 12 opening out through the periphery and forward end thereof for the adjustable reception of blades 14.

In passing, it might be noted that although Figures 1 to 8 disclose the invention in connection with a reamer, it is obvious to those acquainted with this art that the same may be incorporated in numerous other blade cutting tools, for example, a milling cutter, a boring head, or a counter-bore.

The back sides of the blades and the opposed or back sides of the slots are shown in Figures 2, 3 and 4 to be provided with serrations in the form of slidably interfitting teeth extending at rather steep angles, possibly 30 degrees to the longitudinal axis of the blades, to define an adjusting angle. In other words, the adjusting angle produced by the inclined serrations 16, extends at approximately 30 degrees to the longitudinal axis of the tool and thus provides for properly proportioned forward and outward compound adjustment of the blades at an angle of approximately 30 degrees to the longitudinal axis of the tool. Clearly, any preferred adjusting angle may be employed.

In carrying out the invention, one side wall of each slot 12 is provided with a groove 17 extending substantially parallel to the longitudinal axis of the tool and opening out through the forward end of the body 10 for the detachable reception of a wedge 18. In Figures 3 and 5, the wedge 18 is shown to be segmental in cross-section and to have a flattened inner side for uniform pressure contact throughout with the opposed side of the blade so as to force laterally the blade into firm and uniform pressure contact with the back side wall of the slot. Since the wedge 18 is segmental in cross section, as is the groove 17, it is clear that the wedge may rock slightly within the groove to adapt itself to uniform pressure contact with the blade, regardless of the position of adjustment of the blade.

Attention is now invited to the fact that the side walls of the slots 12 are longitudinally and radially parallel, the longitudinal parallelism of the slots being shown in Figure 3, while the radial parallelism of the slots is disclosed in Figure 5.

On the other hand, the side walls of the blades 14 are not parallel or complemental to the side walls of the slots 12 and in fact, the blades diminish in wall thickness along a line parallel to the previously described adjusting angle of the blades. That is to say, there is a compound taper to the blades and such taper runs parallel to the adjusting angle or to the serrations 16 so that the blades increase in wall thickness in the direction of the outer longitudinal edges thereof as well as in the direction of the forward ends thereof, so that when the wedges have been positioned as shown in Figure 3, the cutting thrust on the tool is not allowed to shift the blades.

In other words, when the blade has been set and the wedge is firmly in place the inward movement of the blade along the adjusting angle is inhibited and, of course, the direction of the interfitting serrations 16 precludes the possibility of movement of the blade either radially inward or longitudinally rearward.

To mount the blade in a desired position of adjustment it is simply necessary to place the same in its approximate position in the slot and then lightly tap the wedge 18 into place at the forward end of the tool, after which the blade itself may be struck a somewhat sharper blow at the forward end thereof to lock both the wedge and the blade firmly in place.

To release the blade, it is merely necessary to drive on the rear end thereof as suggested in Figures 2 and 3, to interrupt the binding engagement between the wedge and the blade. In this connection, it is noted that in some blade mountings employing a wedge, it is necessary to provide drilled holes or other means for gaining access to the smaller end of the wedge for striking purposes and this, of course, is obviated in the herein disclosed tool since it is simply necessary to drive forwardly on the blade to release the same. This is a feature of convenience and looks to greater rigidity on the part of the tool.

From the foregoing it will be seen that each blade is securely held in adjusted position by the employment of but a single wedge, dispensing with separate blade fastening screws, pins and the like, which require cutting away of substantial portions of the body of the tool to provide for their accommodation.

As illustrated in Figure 1, the body 10 is shown to be provided with a plurality of spaced, parallel, lines 40' intersecting the slots 12 at right angles to the longitudinal axis of the tool and cooperating with the rear portions of the blades or with suitably marked portions of the blades in defining an ever-present scale by which the blades may be adjusted separately and yet coextensively with a high degree of facility and accuracy without at the same time resorting to extraneous measuring devices.

In the form of invention disclosed in Figures 9, 10, 11 and 12, the numeral 40 designates a carrier or body having a plurality of spaced slots 42 opening out through the periphery and opposite sides or ends of the carrier for the reception of blades 44.

As in the case of the tool shown in Figures 1 to 8 inclusive, the back sides of the blades and the back sides of the slots are provided with coacting serrations in the form of slidable interfitting ribs or teeth extending at rather steep angles, possibly 30 degrees to the longitudinal axis of the tool or to the blade itself to define an adjusting angle, the specific angle of 30° being merely by way of example.

Figure 11:
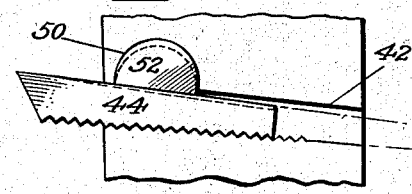
Figure 11 is a fragmentary edge elevation of the tool shown in Figures 9 and 10.

As in that form of the invention shown in Figures 1 to 8, each slot has the side walls thereof longitudinally and radially parallel, the longitudinal parallelism being shown in Figure 11, while the radial parallelism is disclosed in Figure 9.

On the other hand, the side walls of the blade 44 are not parallel or complemental to the side walls of the slot 42 and on the contrary, the blade 44 diminishes in wall thickness along a line parallel to the previously described adjusting angle of the blades.

In other words, there is a compound taper to the blade 44 and such taper runs parallel to the adjusting angle or to the serrations 45 so that the blade will be found to increase in wall thickness in the direction of the outer longitudinal edge thereof as well as in the direction of the forward or cutting end thereof.

Coming now to the means by which the several blades are locked in adjusted position, it is pointed out that one side wall of each slot 42 is provided with a more or less radial socket or recess 50 receiving a wedge 52. Both the recess 50 and the wedge 52 are shown to be of segmental form and to increase in cross sectional area radially outward and it is believed to be clear that with the wedge 52 positioned firmly in the associated recess such wedge will have pressure engagement with the opposed side wall of the adjacent blade 44 to force the back wall of the blade into firm pressure engagement with the back wall of the associated slot 42. In this manner, there is established firm interlocking relation between the opposed complemental serrations 45.

The wedge 52 is, of course, allowed to rock about its own longitudinal axis an extent sufficient to bring about firm and uniform pressure contact throughout between the opposed surfaces of the wedge and associated blade.

Figure 10:
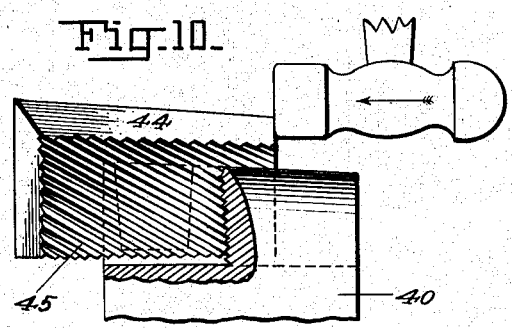
Figure 10 is a detail longitudinal sectional view of the tool shown in Figure 9 and illustrating the manner in which the cutting blade may be driven forwardly and thus released.

To bring about release of the blade, it is merely necessary to drive on the rear end thereof as suggested in Figure 10. This interrupts the binding engagement between the blade and the associated wedge 52.

Since it is possible to release the blade without first releasing the wedge, it will be seen that it is unnecessary to provide means such as drilled holes in the carrier 40 for the purpose of providing for access to the small end of the wedge to drive thereon.

Figure 13:
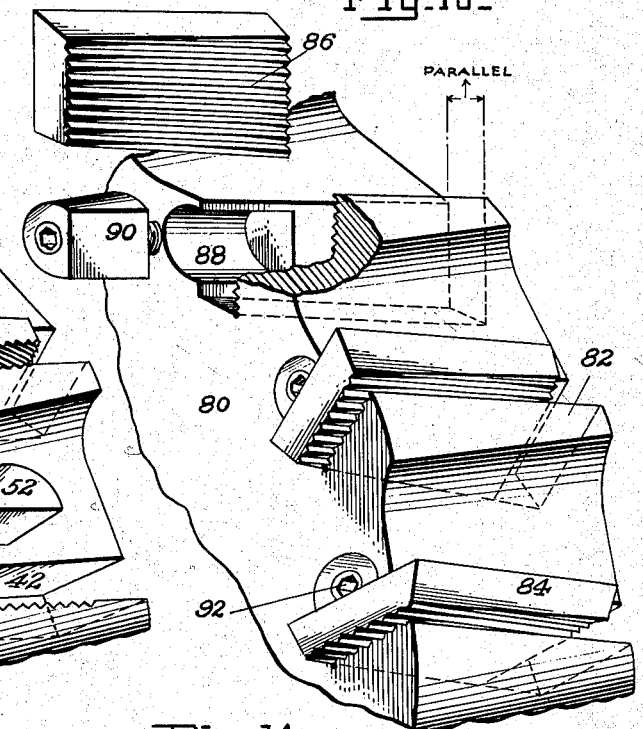
Figure 13 is a fragmentary perspective disclosing another form of cutter.
Figure 14:
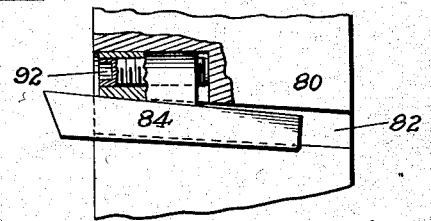
Figure 14 is a fragmentary edge elevation of the cutter disclosed in Figure 13, the view being partly in section.
Figure 15:
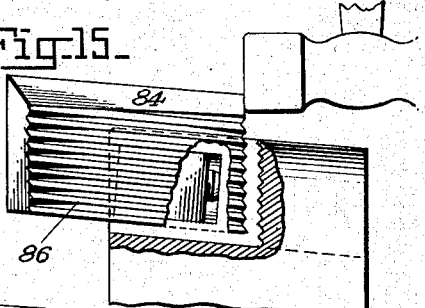
Figure 15 is a detail longitudinal sectional view through the tool shown in Figures 13 and 14.

In the form of invention illustrated in Figures 13, 14 and 15, the carrier is designated by the numeral 80 and is provided with slots 82 opening out through the periphery and opposite sides thereof for the detachable and adjustable reception of blades 84.

As illustrated in Figures 13 and 15, the back sides of the blades and the back side walls of the slots are provided with opposed interfitting complemental serrations 86 parallel to the bottom walls of the blade slots. This arrangement of serrations is more easily produced than the arrangement of serrations shown in Figures 1 to 12 inclusive.

Since the serrations 86 are cut parallel to the bottom walls of the slots, such serrations extend at acute angles to the longitudinal axis of the cutter to provide the required radial adjustment.

In Figures 13 and 14 it is shown that the leading side wall of each slot 82 is formed with a socket or recess 88 opening out through the forward side of the carrier 80 and receiving a segmental wedge 90. Both the wedge 90 and the recess 88 increase in cross-sectional area in the direction of the rear end of the tool. In other words, both the recess 88 and the wedge 90 diminish in cross sectional area in the direction of the cutting end of the blade 84 with the result that by forcing the wedge forwardly in the direction of the cutting end of the tool, the associated blade 84 is forced laterally into firm and uniform pressure contact with the back side wall of the slot.

In Figures 13 and 14 it is also disclosed that the wedge 90 is provided with a threaded opening extending longitudinally therethrough for the reception of a locking screw 92, the rear or inner end of which is adapted for engagement with the rear end wall of the recess 88. Clearly, with the advancement of the screw 92, in pressure engagement with the end wall of the recess 88, the wedge is forced outward so as to bring about a firm pressure engagement of the serrated sides of the slot and the blade.

In the form of invention disclosed in Figures 13 to 16 inclusive the blades 84 have radially parallel side walls, this being shown in Figure 13, while from Figure 14, it will be seen that the side walls of the blades converge in the direction of the rear ends thereof providing a positive wedging action between the blades and the wedges.

To release the blade 84, it is simply necessary to drive forward thereon and thereby break the binding engagement between the blade and the wedge. Of course, preparatory to the resetting of the blade it may be necessary to back up on the screw 92.

Also, it is a very simple matter to break the binding engagement between the blade and wedge by backing up on the screw 92 and then driving rearwardly on the wedge 90. This, of course, releases the wedge from pressure contact with the blade and thus releases the blade for adjustment or other purposes.

Figure 16:
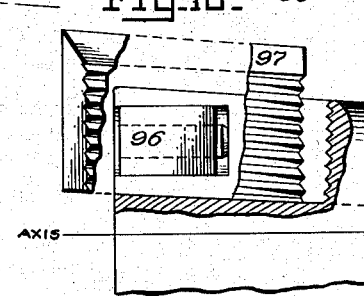
Figure 16 is a detail longitudinal sectional view through another expression of the invention.
Figure 12:
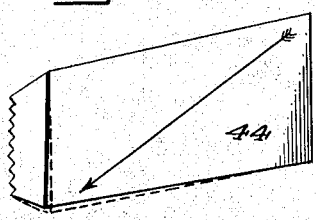
Figure 12 is a perspective of one of the blades shown in Figure 9.

It is illustrated in Figures 13 and 14 that the wedge 90 may be extended parallel to the periphery of the carrier 80 although, if desired, such wedges may extend parallel to the longitudinal axis of the carrier, this latter arrangement being shown in Figure 16 wherein the wedge is designated by the numeral 96 and the blade has the numeral 97 attached thereto.

Having thus described the invention what is claimed is:

1. In an inserted blade cutter, a body having a slot provided with parallel side walls, a blade in said slot and having a cutting end portion, said blade being formed with means cooperating with said side walls in defining an adjusting angle at an acute angle to the longitudinal axis of the blade, said blade being diminished in wall thickness from the outer forward portion thereof to the inner rear portion thereof on a line parallel to the said adjusting angle and means for locking said blade in adjusted position.

2. In an inserted blade cutter, a body having a slot provided with longitudinally and radially parallel side walls, a blade in said slot and having integral means interlocking with a wall of said slot in defining an adjusting angle, said blade being diminished in wall thickness from the outer leading corner portion thereof in the general direction of the inner rear portion thereof, and a wedge engaged with said blade for forcing said interlocking means into locked relationship.

3. In an inserted blade cutter, a body having a slot provided with longitudinally and radially parallel side walls, a blade in said slot, one side wall of said blade and one side wall of said slot being formed with inclined interfitting teeth defining an adjusting angle, said blade being diminished in wall thickness from the outer forward portion thereof in the direction of the inner rear portion thereof along the line substantially parallel to the said adjusting angle and means for locking said blade in adjusted position.

4. In an inserted blade cutter, a body having a slot provided with longitudinally and radially parallel side walls, a blade in said slot, one side wall of said blade and one side wall of said slot being formed with inclined interfitting teeth defining an adjusting angle, said blade being diminished in wall thickness from the outer forward portion thereof in the direction of the inner rear portion thereof along the line substantially parallel to the said adjusting angle, and a wedge carried by the opposite side wall of the slot and engaging the opposite side wall of the blade.

5. In an inserted blade cutter, a body having a slot provided with radially and longitudinally parallel side walls, a blade in the slot and having means cooperating with a side wall of said slot in defining an adjusting angle and also provided with a cutting portion and a rear end, said blade being diminished in wall thickness from the cutting portion thereof to the rear inner portion thereof on a line parallel to said adjusting angle, and a wedge engaging said blade on the side opposite the adjusting angle defining means at approximately right angles thereto, the said rear end of the blade having a portion thereof projecting exteriorly of the slot between the ends of the slot for engagement by a striking tool by which the blade may be driven in the direction of the cutting portion thereof for the purpose of releasing the blade while engaged by said wedge.

6. In a rotary cutter, a body having a slot provided with longitudinally and radially parallel side walls, a blade in such slot, and having means cooperating therewith in defining an adjusting angle, said blade being diminished in wall thickness from the outer forward portion thereof to the rear inner portion thereof, and a wedge carried by said body and disposed at substantially right angles to said blade in pressure engagement therewith.

FRANK P. MILLER.